United States Patent
Battisti et al.

(10) Patent No.: US 9,995,595 B2
(45) Date of Patent: Jun. 12, 2018

(54) METHOD OF DETECTING THE RECIPROCAL POSITION BETWEEN A CYLINDER AND A PISTON A HYDRAULIC OR PNEUMATIC CYLINDER-PISTON UNIT, AS WELL AS CYLINDER-PISTON UNIT FOR IMPLEMENTING SUCH METHOD

(71) Applicants: OPTOELETTRONICA ITALIA SRL, Gardolo (Trento TN) (IT); GIULIANI SRL, Suzzara (Mantova MN) (IT)

(72) Inventors: Nicola Battisti, Trento (IT); Alfredo Maglione, Trento (IT)

(73) Assignees: OPTOELETTRONICA ITALIA SRL (IT); GIULIANI SRL (IT)

( * ) Notice: Subject to any disclaimer, the term of this patent is extended or adjusted under 35 U.S.C. 154(b) by 230 days.

(21) Appl. No.: 14/764,950

(22) PCT Filed: Jan. 29, 2014

(86) PCT No.: PCT/IB2014/058632
§ 371 (c)(1),
(2) Date: Jul. 30, 2015

(87) PCT Pub. No.: WO2014/118709
PCT Pub. Date: Aug. 7, 2014

(65) Prior Publication Data
US 2015/0362334 A1 Dec. 17, 2015

(30) Foreign Application Priority Data
Feb. 1, 2013 (IT) .............................. VR2013A0024

(51) Int. Cl.
*G01D 5/244* (2006.01)
*G01D 5/12* (2006.01)
*G01D 18/00* (2006.01)

(52) U.S. Cl.
CPC ............. *G01D 5/12* (2013.01); *G01D 5/2448* (2013.01); *G01D 18/006* (2013.01)

(58) Field of Classification Search
CPC ....... G01D 18/006; G01D 5/2448; G01D 5/12
See application file for complete search history.

(56) References Cited

U.S. PATENT DOCUMENTS 5,497,084 A 3/1996 Bicking
6,327,791 B1 12/2001 Norcross et al.
(Continued)

FOREIGN PATENT DOCUMENTS

DE 197 12 829 A1 10/1998
GB 2 395 002 5/2004

OTHER PUBLICATIONS

International Search Report dated Nov. 21, 2014 issued in corresponding International patent application No. PCT/IB2014/058632.
(Continued)

*Primary Examiner* — Bryan Bui
(74) *Attorney, Agent, or Firm* — Ostrolenk Faber LLP

(57) ABSTRACT

A method for detecting the reciprocal position between a cylinder and a piston in a cylinder-piston unit, including the following phases: setup of a cylinder-piston unit featuring at least one tubular body (2) presenting at least one passing accommodation host (6); at least one moving body (5) which can be longitudinally shifted in the tubular body (2), featuring at least one reference area (5c) extending for a portion (5d) on the surface of the moving body (5); a detector (7) which can be accommodated in such passing accommodation host (6), oriented towards the moving body (5) and detecting the presence or absence of the reference area (5c) at one detection area (7c), and to generate at least one corresponding output electrical signal (s7), in response to detection of the reference area (5c); at least one elaboration and program control unit (8) receives as an input at least one
(Continued)

of the output electrical signals (s7) and generates at least one electrical signal (s8) of detection; activation of the detector (7) (phase 100); elaboration by at least one of the elaboration and program control units (8) of at least one of the signals (s7) which are from the detector (7) (phase 200), the elaboration phase including a comparison (phase 220) between at least one of the output electrical signals (s7) and the respective maximum and minimum reference thresholds ($S_{max}$, $S_{min}$); based on the elaboration (phase 200), generating electrical signal of detection (s8) by at least one of the elaboration and program control units (8) (phase 300); the maximum and minimum reference thresholds ($S_{max}$, $S_{min}$) being periodically updated.

17 Claims, 13 Drawing Sheets

(56) References Cited

U.S. PATENT DOCUMENTS

| | | | |
|---|---|---|---|
| 2002/0100866 A1 | 8/2002 | Butka et al. | |
| 2010/0292657 A1* | 11/2010 | Fontanazzi | A61M 1/3621 |
| | | | 604/256 |

OTHER PUBLICATIONS

International Preliminary Report on Patentability dated May 21, 2015 issued in corresponding International patent application No. PCT/IB2014/058632.

\* cited by examiner

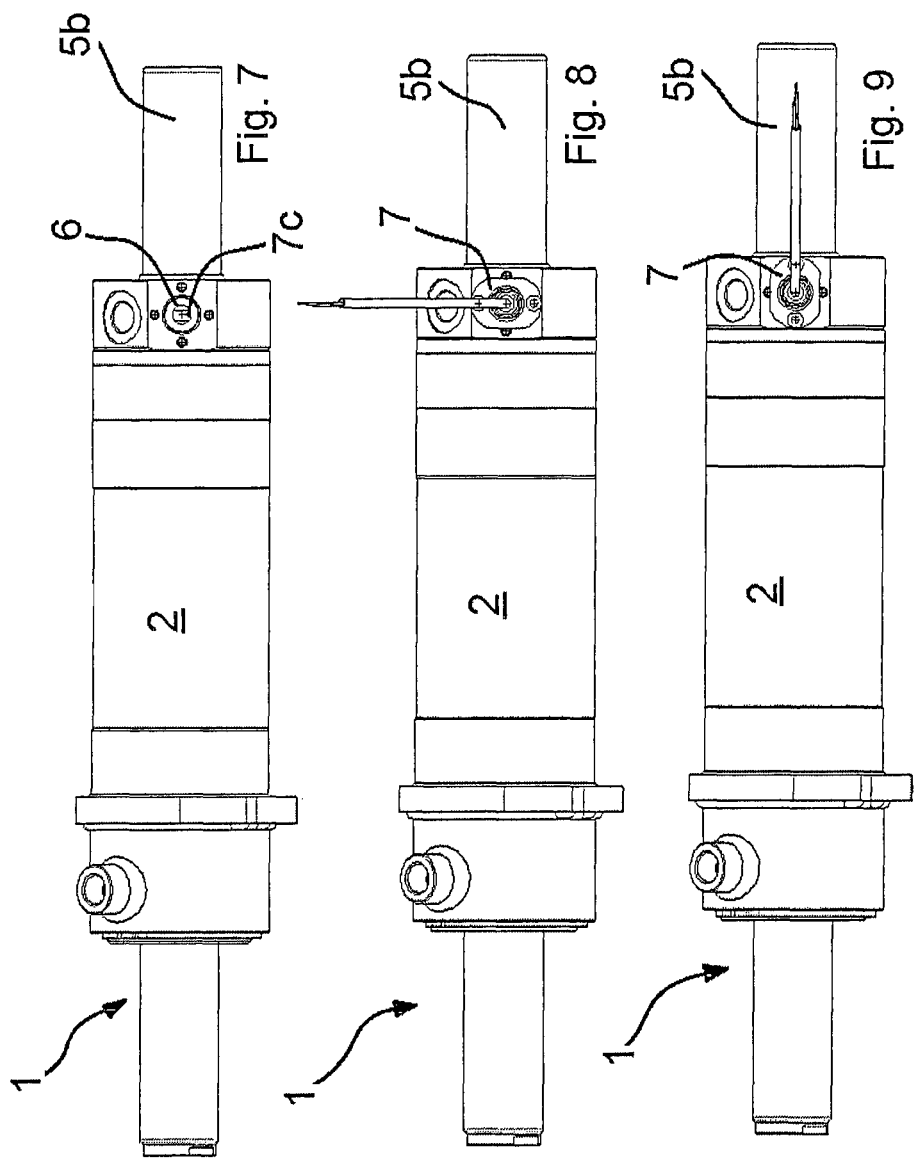

METHOD OF DETECTING THE RECIPROCAL POSITION BETWEEN A CYLINDER AND A PISTON A HYDRAULIC OR PNEUMATIC CYLINDER-PISTON UNIT, AS WELL AS CYLINDER-PISTON UNIT FOR IMPLEMENTING SUCH METHOD

CROSS REFERENCE TO RELATED APPLICATIONS

The present application is a 35 U.S.C. § 371 National Phase conversion of PCT/IB2014/058632, filed Jan. 29, 2014, which claims benefit of Italian Application No. VR2013A000024, filed Feb. 1, 2013, the disclosure of which is incorporated herein by reference. The PCT International Application was published in the English language.

TECHNICAL FIELD OF THE INVENTION

The present invention concerns a method of detecting the reciprocal position between a cylinder and a piston in a hydraulic or pneumatic cylinder-piston unit.

Moreover, the present invention concerns a hydraulic or pneumatic cylinder-piston unit for implementing such method.

BACKGROUND OF THE INVENTION

In the state of the art, in order to detect the mutual or reciprocal position between a cylinder and a respective piston slidable in it, the piston rod rigid with the piston, e. g. made of steel, is provided with one or more reference areas, which can be detected by suitable detecting means provided on the respective cylinder. More particularly, each reference area is typically obtained on the surface of the piston rod, e. g. through a laser processing along a larger or lesser extension of an arc of circumference of the circular cross-section thereof, and extends along the piston rod axis through a predetermined length usually ranging from 1 mm to 7 mm according to the operator's requirements.

The detecting means of a reference area are usually provided at one of the two ends of the cylinder, received in a receiving seat formed therein and facing the piston rod of the cylinder-piston unit. Such detecting means are designed to detect, at a detection area or region thereof, the presence or absence of the reference area on the piston rod, once the reference area lies at such detection zone during the piston stroke within the cylinder.

The detecting means usually used for detecting a reference area on the piston rod are based on the difference in the reflected light radiation incident on the piston rod either inside or outside the reference area. To this end, they usually include a emitting means light radiation incident, in use, onto the piston rod surface at the detection area, and a respective receiving means arranged to receive such radiation reflected by the piston rod surface. The light radiation is almost totally reflected by the piston rod surface not bearing a reference area, whereas the radiation is absorbed to a greater extent by the surface bearing the reference area. Accordingly, the electrical signal to be processed at the receiving means output, which is typically of an analogic type, will have a lower amplitude at a reference area with respect to that detectable at a piston rod portion not bearing such area. The output signal generated by the receiving means is subsequently processed by a suitable data processing unit. At the output of such data processing unit, once the reference area has been detected on the piston rod, a suitable electrical detection signal is generated, typically having a step-shape, which will be used for subsequent processing depending upon the use of the cylinder-piston unit.

For example, should the cylinder-piston unit be mounted in a known way on the axle of a car provided with steering wheels and the detection of the reference area by the detecting means correspond to the laying of each wheel on a plane orthogonal to the longitudinal axis of the axle, the detection signal can be sent to the control unit of the car for blocking the wheel movement on such orthogonal plane.

The cylinder-piston units of the state of the art suffer from a number of drawbacks.

First of all, the detecting means in time detect the presence or absence of the reference area on the piston rod in an increasingly less accurate way, because it becomes deteriorated due to prolonged use of the cylinder-piston unit. The often extreme working conditions, e. g. very low or very high temperatures, also affect the operation of the detecting means and the other components of the cylinder-piston unit, which results in an unreliable spotting of, or failure to spot the reference area at the detection area by the detecting means.

Another limitation of the state of the art cylinder-piston units is that they do not meet the requirements of the operators in the art who experience the need of adjusting the trend of the detection signal (in jargon referred to as "field of action") in a simple and economic manner depending upon the applications. As is known, the trend of such an electrical detection signal also depends on the size of the reference area provided on the piston rodpiston rod.

In some applications, it may happen that the electrical detection signal at the output of the data processing unit is used for turning on a warning light, and that as a response to the warning light being turned on an operator is expected to implement specific operations. In this case, it is preferable that the warning light is kept on or off for sufficiently long time intervals, so that a clearly interpretable signal is sent to the operator. However, it often happens that the detection signal is swinging owing to vibrations the cylinder-piston unit is experiencing in some specific applications, or because the time interval during which the reference area remains at the detecting means is short. For these reasons, the warning light goes on being switched on and off, thereby sending a signal which is difficult to be interpreted by the operator.

In order to compensate the undesired effect mentioned above, it is preferable that the width of the reference area on the piston rod is large, so that the output signal correlated to it from the detecting means, either high or low, is stable for a longer time, the working conditions being the same, with respect to the case in which the width of the reference area is smaller along the piston rod.

In other circumstances, for example when the output detection signal from the data processing unit is sent to an automated actuator assembly, it is preferable that the automated actuator assembly is promptly energized upon the detection signal being generated. In this case, it would be preferable that the width of the detection area along the piston rod is reduced, or in other words the "field of action" is more limited or narrow. In the case referred to above, where for example the cylinder-piston unit is mounted in a known manner on the axle of a car provided with steering wheels and the detection of the reference area by the detecting means corresponds to the laying of each wheel in a plane orthogonal to the longitudinal axis of the axle, the narrower the width of the reference area along the piston rod, the more accurate and reliable the detection of the position of each wheel in such a plane. The automated actuator assembly will be energized in order to limit the rotation of each wheel in such plane, as soon as the detection signal is generated.

As mentioned above, in order to adjust the shape of the output detection signal of the data processing unit, the operator, up to now, has only had the possibility of having cylinder-piston units provided with reference areas of different widths along the piston rod axis, and mounting each time the one provided with adequate dimensions in order to satisfy his needs.

It is clear that this procedure is economically inconvenient for the operator, as well as complex to be implemented, since it requires, each time, the selection, among the available cylinder-piston units, of the one which is more suitable, given the circumstances, and the use of one or another.

SUMMARY OF THE INVENTION

Accordingly, the main object of the present invention is to provide for a method of detecting the reciprocal position between a cylinder and a piston in a cylinder-piston unit which is precise and reliable.

A further object of the present invention is to give a method for detecting the reciprocal position between a cylinder and a piston in a cylinder-piston unit, which is practical to be implemented.

Another object of the present invention is that of providing make a cylinder-piston unit for implementing the method of detecting the reciprocal position between a cylinder and a piston, which is easy to manufacture at competitive costs.

Still another object of the present invention is to provide for a cylinder-piston unit for implementing the method of detecting the reciprocal position of the cylinder and the piston, which responds to the detection of the reference area according to time intervals practically adjustable by the operator.

According to a first aspect of the present invention there is provided a method for detecting the reciprocal position of a cylinder and a piston within a cylinder-position unit, such method comprising the following steps of:

arranging a cylinder-piston unit including:
  at least one tubular body having at least one through receiving seat;
  at least one moving body longitudinally translatable in the tubular body, the moving body being provided with at least one reference area extending on a portion of the surface of the moving body, along the longitudinal axis thereof;
  at least detecting means, receivable in the through receiving seat of the tubular body, faced towards the moving body in such tubular body, and designed to detect the presence or absence of such a reference area at a detection area thereof, and to generate at least one corresponding output electrical signal, in response to the detection or not of the reference area of the moving body;
  at least one program control and processing unit, designed to receive in input the at least one output electrical signal from such detecting means, and to generate in output at least one electrical signal of detection;
activating such detecting means;
processing the at least one output signal from such detecting means by the at least one program control and processing unit, the processing step including a comparison between the at least one output electrical signal and corresponding maximum and minimum reference threshold values;
generating, based on such processing, an electrical signal of detection by the at least one program control and processing unit;

characterized in that
such maximum and minimum reference threshold values are periodically updateable.

According to an additional aspect of the present invention, a cylinder-piston unit is provided for implementing the detection method according to the first aspect of the present invention, comprising:

at least one tubular body provided with at least one through receiving seat;
at least one moving body longitudinally translatable on the longitudinal axis of such a tubular body, the tubular body being provided with at least one reference area extending on a portion of the surface of such a moving body, along the longitudinal axis thereof;
at least detecting means, receivable in such a through receiving seat of such a tubular body, faced towards such a moving body within such tubular body, and designed to detect the presence or absence of such a reference area at a detection areas area thereof, and to generate at least one respective output electrical signal, in response to the detection or not of such a reference area of such a moving body;
at least one processing and program control unit, designed to receive in input the at least one electrical signal from such detecting means, and to generate as output at least one electrical signal of detection;

characterized in that
such control and processing unit comprises at least one pre-processing stage for at the least one output electrical signal and in that such detecting means are removably receivable in such a receiving seat according to at least one operative configuration, such that, depending on the at least one operative configuration, the output electrical signal from such pre-processing stage of such a program control and processing unit has, at a portion thereof of detection of such reference area, a width which is substantially equal or narrower or wider than the width of such a portion of the reference area in such moving body.

BRIEF DESCRIPTION OF THE DRAWINGS

Further aspects and advantages of the present invention will appear from the following detailed description of a currently preferred embodiment, given as a non limiting example with reference to the attached drawings wherein:

FIG. 7 shows the top view of the cylinder-piston unit of FIG. 1, and in particular, the receiving seat for respective detecting means;

FIG. 8 is the top view of the cylinder-piston unit of FIG. 1, wherein the detecting means are inserted according to a first optional operative configuration;

FIG. 9 is the top view of the cylinder-piston unit of FIG. 1, wherein the detecting means are inserted according to a second optional operative configuration;

DESCRIPTION OF PREFERRED EMBODIMENTS

Figure 1:
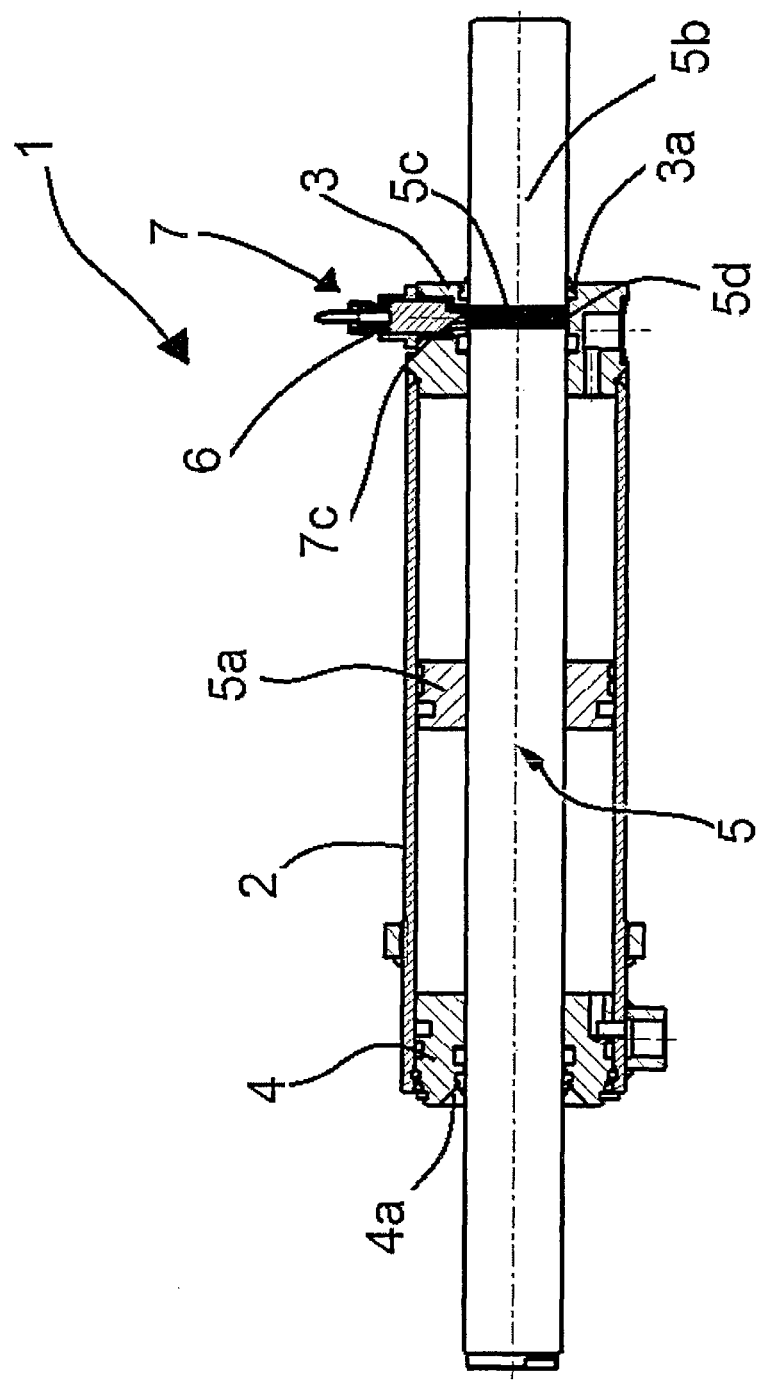
FIG. 1 shows a side cross-section view of the cylinder-piston unit for implementing the method according to the present invention.

In the enclosed drawings, similar or identical parts or components were assigned the same reference numeral.

With reference now to FIG. 1, it is of note that a cylinder-piston unit provided for implementing the method according to the present invention is generally indicated with reference number 1 and it comprises a tubular body 2, for example having a circular cross-section, closed at its ends by respective head walls 3 and 4, each presenting a through opening 3a and 4a. In the tubular body 2 a moving body 5 is translatably mounted, along the longitudinal axis thereof. The moving body 5 typically comprises a piston 5a and a piston rod 5b fixed thereto. The moving body 5 and, in particular, the piston rod 5b exceed the fixed tubular body 2 through the through openings 3a and 4a obtained therein.

The moving body 5 of the cylinder-piston unit and, more specifically, the piston rod 5b presents a reference area 5c obtained, for example, by means of laser processing of the surface thereof, e.g. made of steel, advantageously obtained all around the piston rod, along the circumference delimited by the cross-section and extending for a predefined portion 5b, for example equal to 1 mm or 3 mm or 7 mm, in the longitudinal direction of the piston rod.

In the tubular body 2 of the cylinder-piston unit according to the present invention a through receiving seat 6 is also provided, designed to receive and keep engaged therein detecting means 7, which detecting means are receivable in the receiving seat facing toward the moving body 5 of the cylinder-piston unit. The through receiving seat 6 is preferably obtained at one of the head walls of the tubular body 2, in the illustrated specific case in the head wall 3. If desired, The receiving seat can be also obtained in the tubular body in a central portion thereof.

With such a configuration, the skilled person will easily understand that the peculiar geometrical configuration of the reference area 5c on the moving body 5 is always detectable from the detecting means 7, regardless of the reciprocal rotation between the fixed body 2 and the moving body 5 of the cylinder-piston unit.

The detecting means 7 of the cylinder-piston unit according to the present invention, comprise at least one emitting means 7a of light radiation RL, facing the moving body 5 and, in particular, the piston rod 5b and designed, in use, to generate light radiation RL towards the moving body 5. Advantageously, the detecting means 7 also comprise at least one receiving means 7b for the light radiations reflected by the moving body 5. The detecting means 7 delimit one area or detection zone 7c, wherein the emitting means 7a and the receiving means 7b emit and detect the light radiations RL, respectively.

The detecting means 7 of the cylinder-piston unit, just like the sensor means of the state of the art, make use of the difference in the reflection of the light radiations RL, incident on the moving body 5 inside or outside the reference area. In fact, when the light radiations are incident on the moving body 5 at the reference area 5c, they are mostly absorbed so that only a fraction thereof is reflected and accordingly detected by the receiving means 7b. On the other hand, when the light radiations RL are incident on a portion of the moving body 5 outside the reference area 5c, they are mostly reflected and directed towards the receiving means 7b.

Figure 2:
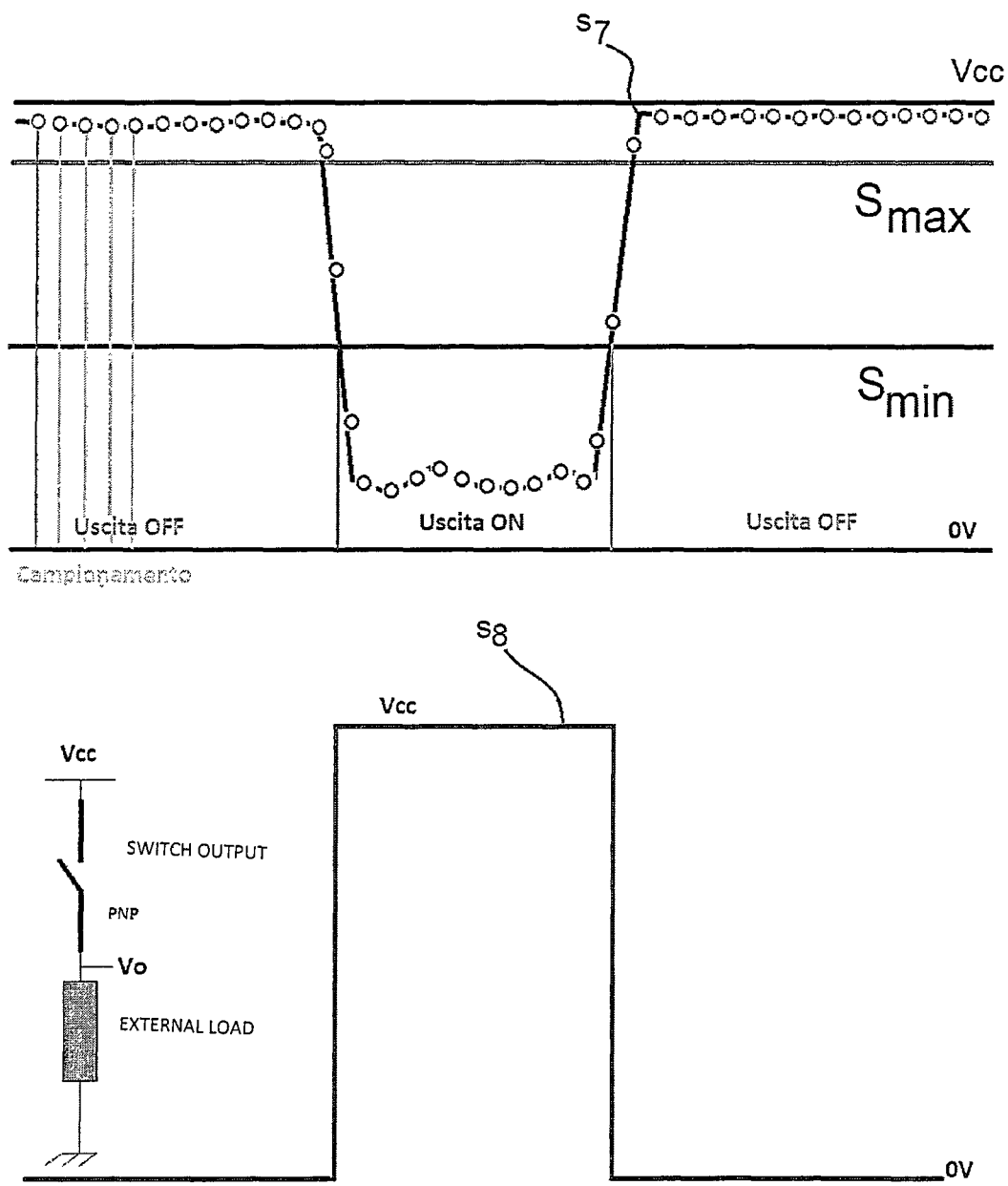
FIG. 2 shows, on top, a typical shape of an analog signal to be elaborated output from the detecting means provided in the cylinder-piston unit of FIG. 1, and at the bottom, the respective signal of detection, output from a program control and data processing unit, also provided in the cylinder-piston unit of FIG. 1, respectively.

Each receiving means 7b generates a step waveform output signal s7, usually analog, for example of the kind shown in FIG. 2. Such signal s7 has higher amplitude (approximately similar to the detecting means supply voltage $V_{cc}$), whenever, at the area or detection zone 7c of the detecting means 7, a portion of the moving body 5 is present which is external to the reference area 5c. On the other hand, when the reference area 5c is in the detection area 7c, signal s7 has a lower amplitude.

Advantageously, each receiving means 7b of the detecting means 7 is configured so that the difference between the signal amplitude detected at reference area 5c and the signal amplitude detected in an area external thereto is considerable, for example equal to about $V_{cc}/2$. It is known that, when the reference area 5c is detected, the timeframe of the output signal form each receiving means 7b not only depends on the spatial width 5b of the reference area, but also on the stroke speed of the moving body 5 with respect to the fixed tubular body 2.

The cylinder-piston unit according to the present invention, comprises a program control and processing unit 8, either internal or external to the detecting means 7, which is designed to receive and analyse the output electrical signal s7 from each receiving means. Based on the processing of the input received signal or signals, typically of the analog type, the program control and processing unit 8 generates in output a signal of detection s8, usually of digital type.

According to a first embodiment of the present invention the detecting means 7 of the cylinder-piston unit comprise only one emitting means 7a of light radiation RL and only one receiving means 7b. In this case, the output signal s8 from the program control and processing unit 8 has a shape of the kind shown in FIG. 2.

Figure 10:
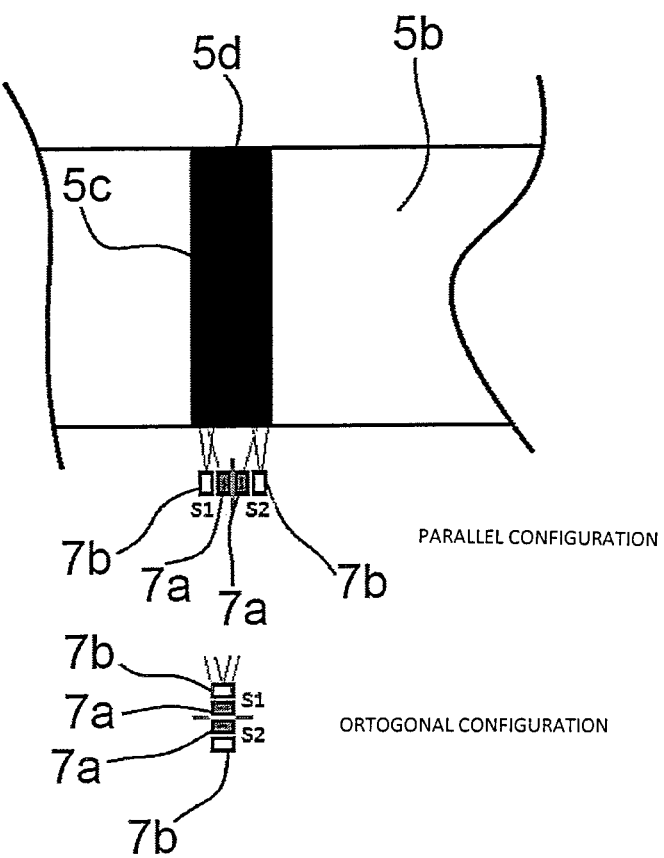
FIG. 10 shows two particular operative configurations of the emitting and receiving means of the detecting means of the cylinder-piston unit according to the present invention, one parallel and the other orthogonal to the longitudinal axis of the cylinder-piston unit, respectively.

According to a second example of setting for the present invention, the detecting means 7 comprise at least one emitting means 7a and a plurality of receiving means 7b. In such a case, for example, in FIG. 10 two particular configurations are shown, wherein two emitting-receiving couples 7a-7b, indicated as S1 and S2, are arranged side by side, however other configurations are not excluded, for example, combinations of one emitting means 7a and two receiving means 7b placed opposite with respect to the emitting means.

The detecting means 7 according to the second embodiment can advantageously be inserted in the respective receiving seats 6, provided in the fixed body 2 of the cylinder-piston unit, in such a way that the emitting means 7a and the plurality of receiving means 7b are arranged according to an operative configuration, e.g. parallel or orthogonal to the longitudinal axis of the cylinder-piston unit (Figures from 11 to 14). The skilled person will easily understand that other operative configurations are possible, e.g. wherein the emitting means 7a and receiving means 7b are received in the receiving seat 6 of the fixed body 2 of the cylinder-piston unit, aligned according to an angle between 0° and 90° with respect to the longitudinal axis of the cylinder-piston unit.

In the particular configurations shown in Figures from 11 to 14, the emitting-receiving couples S1 and S2 are placed side by side in order to form a configuration parallel or orthogonal to the longitudinal axis of the cylinder-piston unit, so that the respective receiving means 7b are located at both (first and far) ends of each configuration. Optionally, the emitting-receiving couples of the detecting means can be placed either in contact or spaced from one another, while keeping the abovementioned configuration, i.e. with the respective receiving means 7b opposite with respect to one or more emitting. The skilled person will understand that other configurations of the emitting means 7a and reception 7b are possible. For example, the emitting means 7a and receiving 7b can be alternated.

With such configuration of the emitting means 7a and receiving 7b of the detecting means 7, the program control and processing unit 8 advantageously comprises a pre-processing stage for the output signals s7 from each receiving means 7b. Such a pre-processing stage employs a logic gate selected between an AND or an OR or a SUM or a PRODUCT or a DIFFERENCE or a DIVISION gate, or a combination of thereof. It will be easily understood that, according to the employed logic gate or gates, the sp signal, output from the pre-processing stage, which will be subsequently processed by the program control and processing unit 8, will present, at the portion thereof corresponding the detection of the reference area 5c by the detecting means 7, a width wider or narrower than the effective width 5d of the reference area 5c along the longitudinal axis of the moving body 5.

Figure 13:
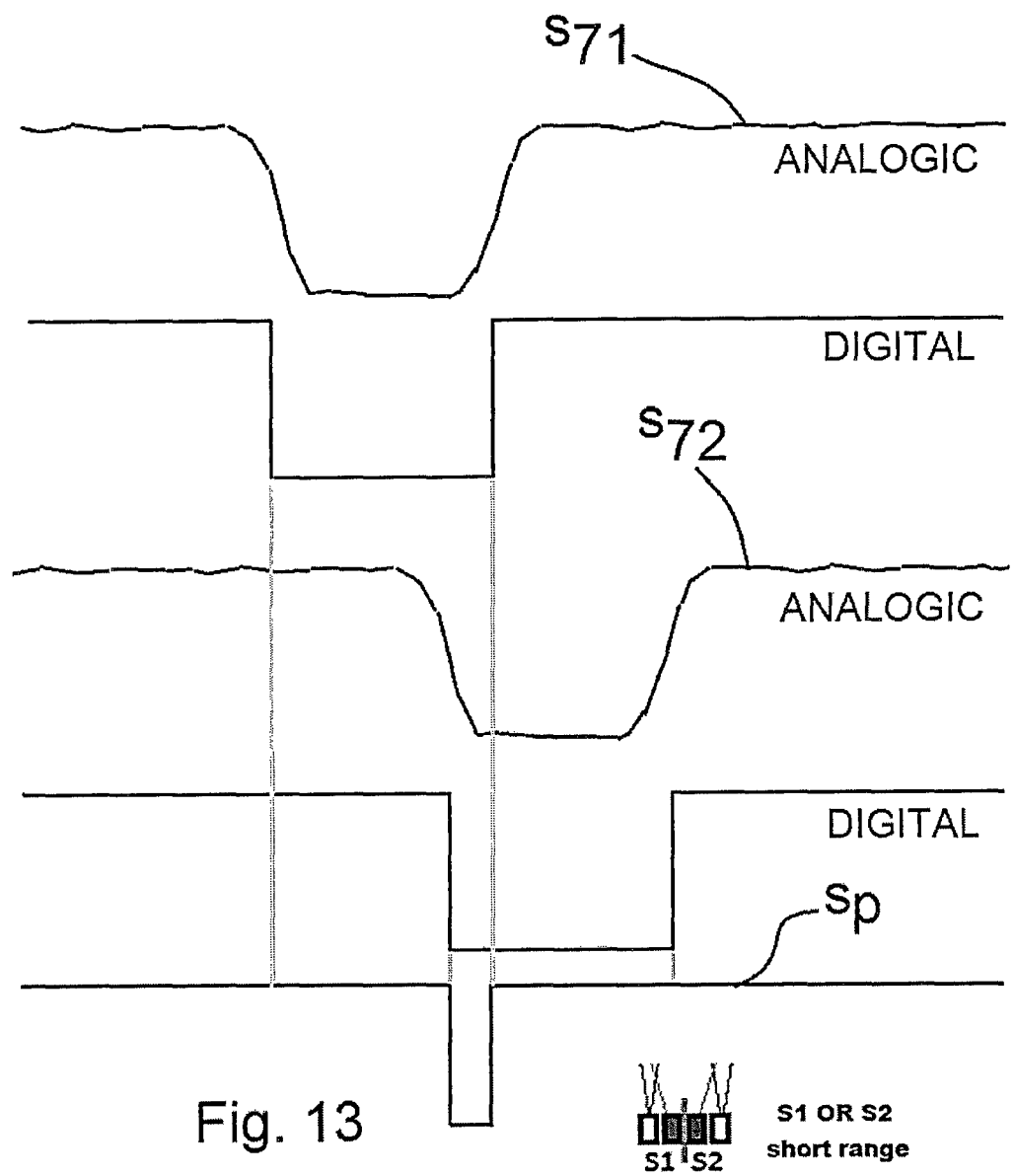
FIG. 13 graphically shows the input and output signals to and from a pre-processing stage of the program control and processing unit of the cylinder-piston unit according to a second embodiment of the present invention, wherein the detecting means are arranged according to a configuration parallel to the longitudinal axis of the cylinder-piston unit.
Figure 14:
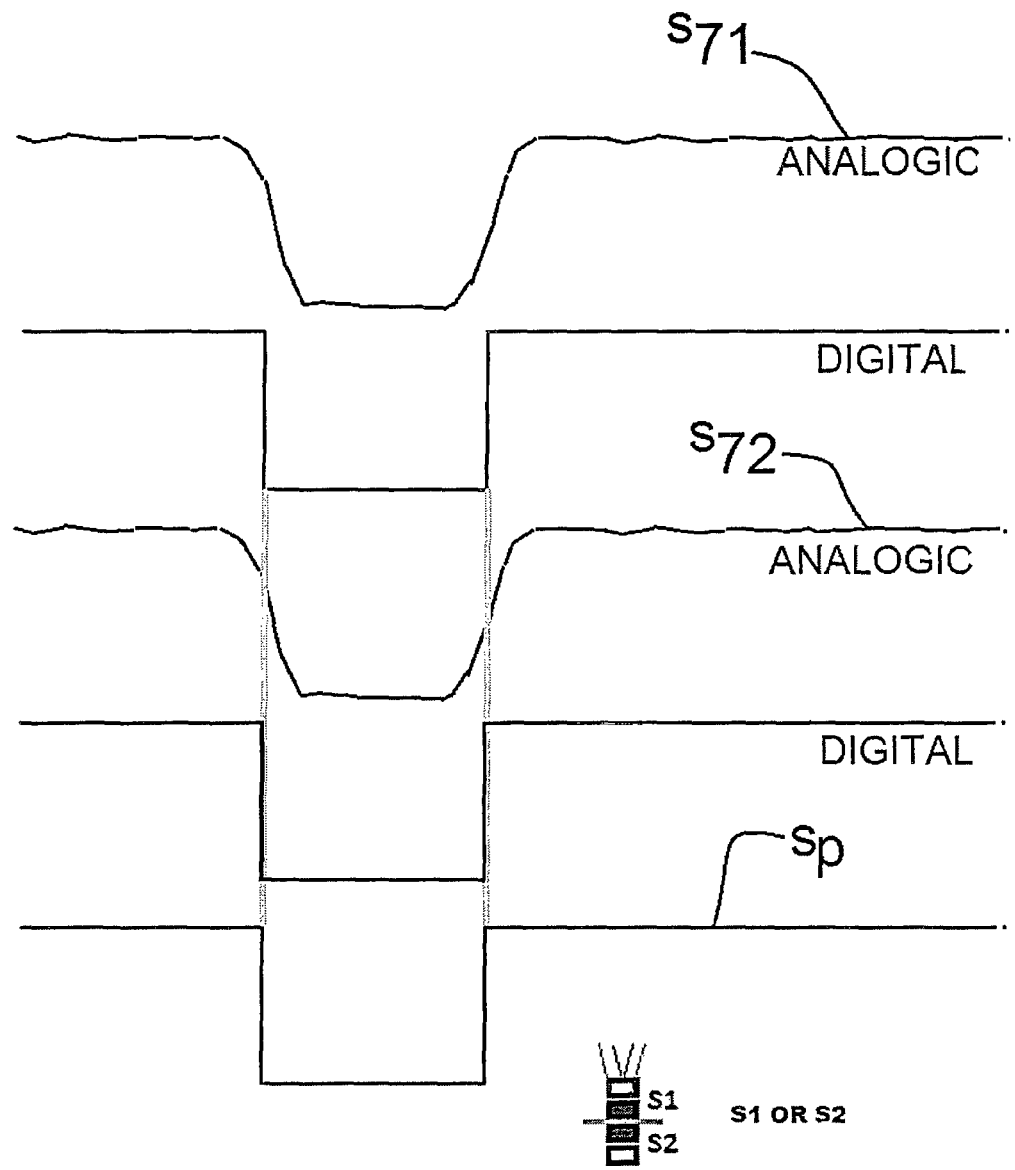
FIG. 14 graphically illustrates the input and output signals to and from a pre-processing stage as in FIG. 13, wherein the detecting means are arranged according to a configuration orthogonal to the longitudinal axis of the cylinder-piston unit.

For example, in the particular case wherein the detecting means 7 and, in particular, the emitting-receiving couples S1, S2 are arranged in an operative configuration parallel to the longitudinal axis of the cylinder-piston unit, the sp signal output from the pre-processing stage will show, at the portion thereof having lower amplitude, a narrower width than the effective width 5d of the reference area 5c on the moving body 5, if the OR logic gate is used (FIG. 13). On the other hand, if, under the same operative conditions, the same configuration of the detecting means 7 is arranged orthogonal to the axis of the cylinder-piston unit, the electrical signal output from the pre-processing stage will show, at the portion thereof having lower amplitude, a width about equal to the effective width 5d of the reference area 5c (FIG. 14).

Figure 11:
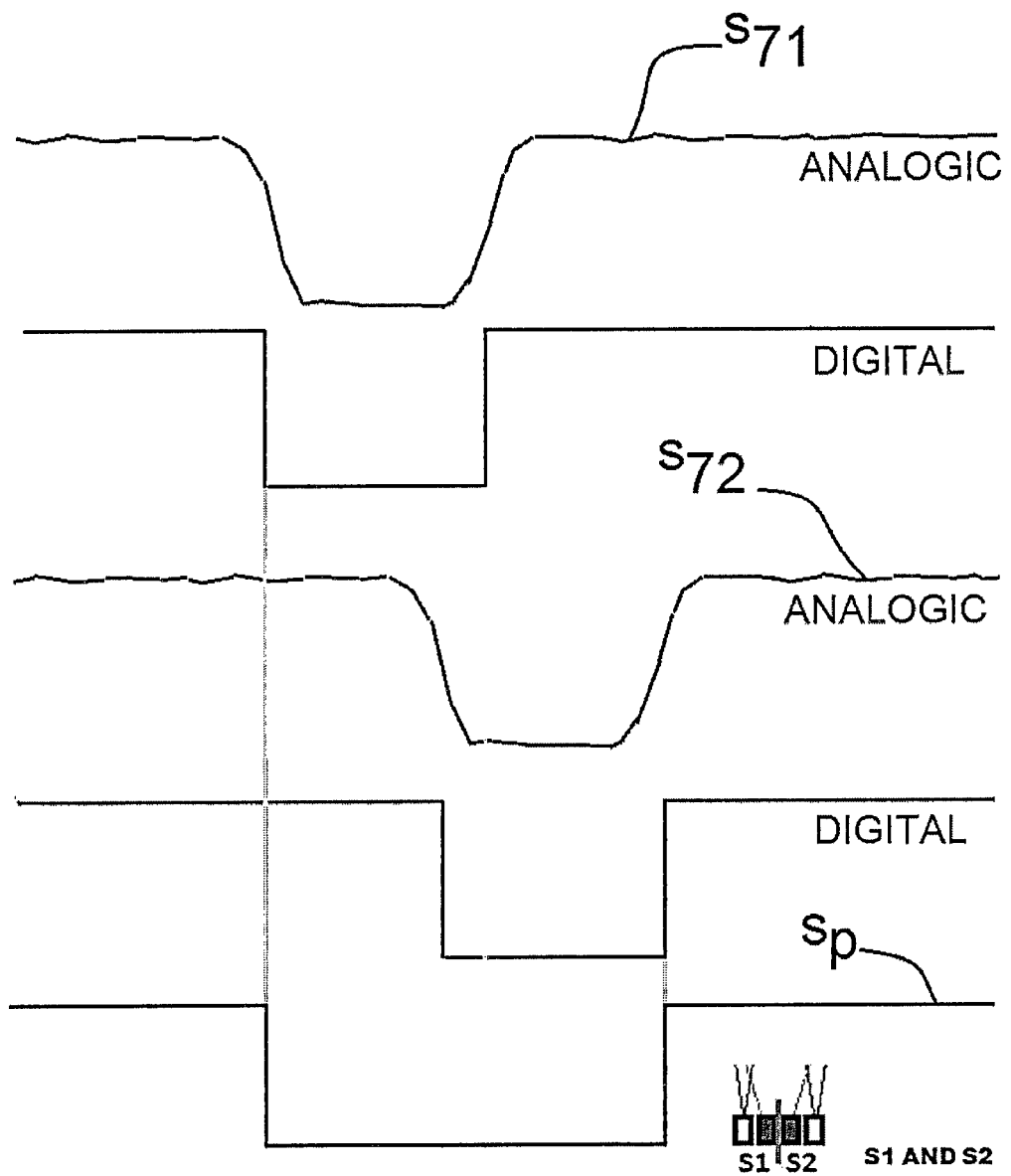
FIG. 11 graphically illustrates the input and output signals of a pre-processing stage of the program control and processing unit of the cylinder-piston unit according to a first embodiment of the present invention, wherein the detecting means are arranged according to a configuration parallel to the longitudinal axis of the cylinder-piston unit.
Figure 12:
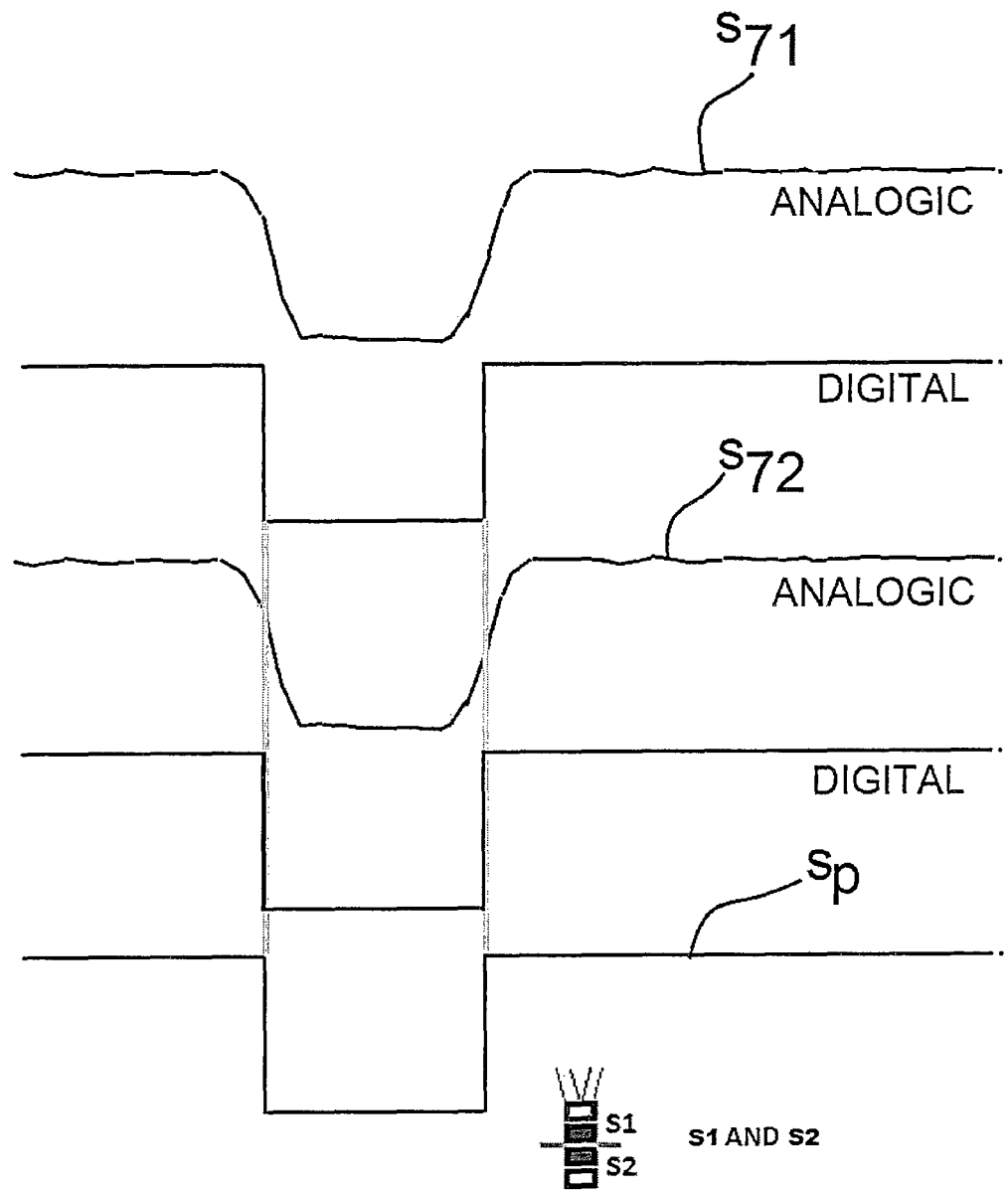
FIG. 12 graphically illustrates the input and output signals to and from a pre-processing stage as in FIG. 11, wherein the detecting means are arranged according to a configuration orthogonal to the longitudinal axis of the cylinder-piston unit.

In another case wherein the detecting means 7 are arranged in a configuration parallel to the longitudinal axis of the cylinder-piston unit, but the employed logic gate is an AND gate, the sp signal output from the pre-processing stage will show a larger/wider width than the width 5d of the reference area 5c on the moving body 5 of the cylinder-piston unit (FIG. 11). On the other hand, under the same operative conditions, if the same configuration of the detecting means 7 is arranged orthogonal to the axis of the cylinder-piston unit, the electrical signal sp output from the pre-processing stage will show, at the portion thereof having lower amplitude, a width substantially equal to the width of the effective width 5d of the reference area 5c (FIG. 12).

The skilled person will easily understand that by changing the distance between the receiving means 7b, in the configuration parallel to the longitudinal axis of the cylinder-piston unit, depending on the logic gate used in the pre-processing stage, an electrical signal sp output from the pre-processing stage will be obtained having a width between about 0 and 2 times the effective width of the reference area 5c on the moving body 5 of the cylinder-piston unit.

Accordingly, thanks to the introduction of the pre-processing stage described above, an operator willing to adjust the "field of action" of the unit while keeping the same cylinder-piston unit, only has to move the detecting means 7 in their receiving seat 6 from one operative configuration to the other. It is, therefore, not necessary any more to select, among different cylinder-piston units each provided with a reference area 5c with a different effective width 5d, the one which is the most adequate to be used in the application.

The detection of the reciprocal position between the fixed body 2 and the moving body 5 of the cylinder-piston unit 1 as described above, is extremely simple and reliable.

Figure 3:
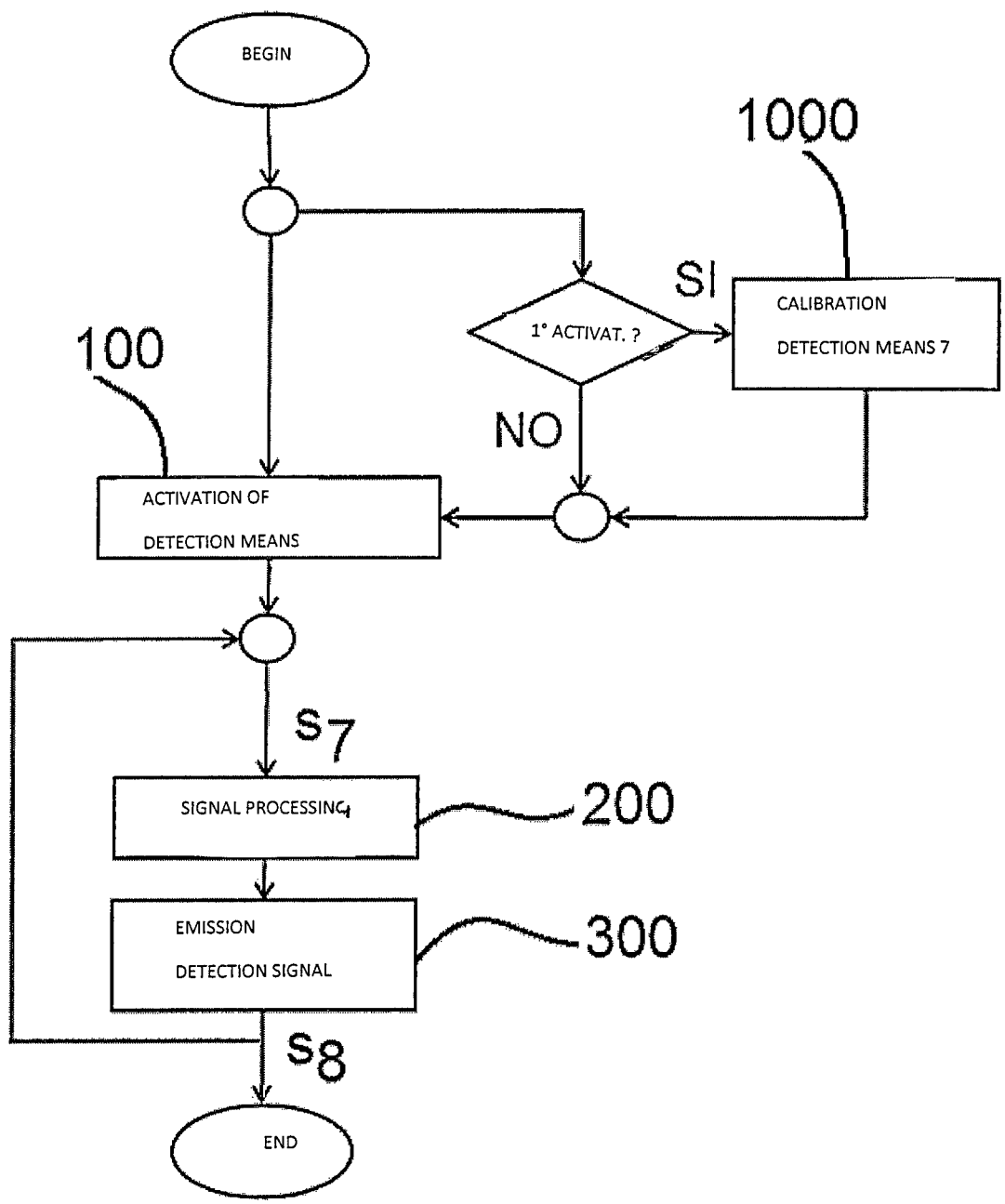
FIG. 3 illustrates a flowchart of the method of detecting the reciprocal position between the cylinder and the piston according to the present invention.

Such a detection—see FIG. 3—provides for the activation of the detecting means 7 at the initial step 100. At a later step 200 the processing of the electric signal output from the detecting means occurs, and at a further step 300, the emission of a signal s8 of detection is generated by the program control and processing unit, based on the elaboration carried out by it.

Figure 4A:
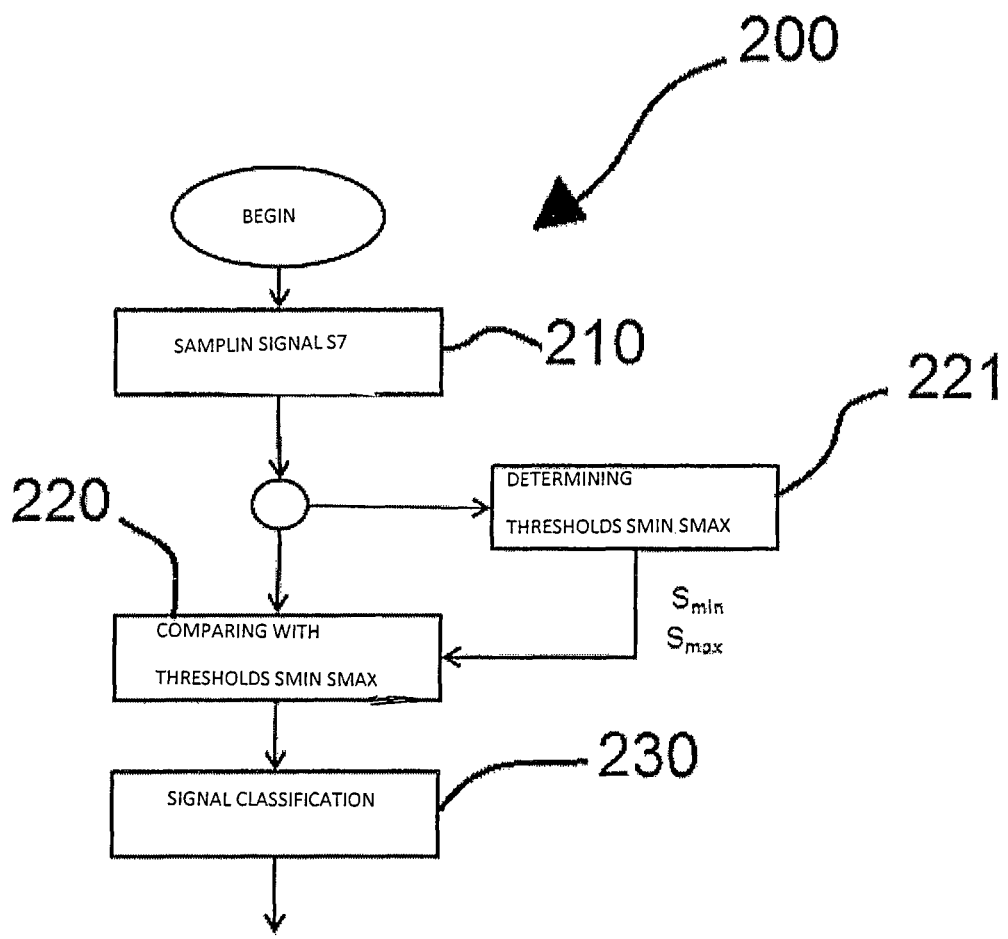
FIGS. 4a and 4b illustrate the flowchart of the processing step of the signal output from the detecting means, according to a first and a second embodiment for the cylinder-piston unit for implementing the method according to the present invention, respectively.

With particular reference to the signal elaboration step 200—see FIG. 4a—in the case wherein the detecting means 7 comprise, according to the first embodiment of the cylinder-piston unit described above, a single emitting means 7a and a single receiving means 7b, the output electrical signal s7, generated by the receiving means 7b of the detecting means 7, is properly sampled at step 210 (for example at a sampling frequency approximately equal to 1 kHz) and compared, at step 220, to reference threshold values $S_{max}$ and $S_{min}$, which threshold values are advantageously updateable, in the sense that they can be periodically updated in order to take into account potential drifts in signal s7, as will be better explained below. As it is known, the drifts of signal s7 can be caused, for example, by the ageing of the emitting means 7a, by temperature variations, by the presence of oil on the piston rod 5b of piston 5a, by the detecting means 7 getting either more distant or closer to the moving body 5, or they can also be caused by assembling errors in the cylinder-piston unit on the corresponding axle or further by the presence of scratches on the moving body 5, leading to a potential modification in the reflection of the light radiation incident thereon.

More particularly, the periodic update of such reference threshold values $S_{max}$ and $S_{min}$ is implemented, in parallel to step 220, at step 221, wherein each sample of the output electrical signal s7 from the detecting means 7 is classified, based on its amplitude, according to three different classes:

reference area, if its amplitude is lower than a first minimum threshold value $PS_{min}$, set by the manufacturer;

absence of reference area, if the signal amplitude is higher than a first maximum threshold value $PS_{max}$, set by the manufacturer; and undetermined, when the detected sample has an intermediate amplitude between the first minimum threshold value $PS_{min}$ and the first maximum threshold value $PS_{max}$ (hysteresis), set by the manufacturer and previously stored in the program control and processing unit 8, for example in an EEPROM memory.

Once a certain amount of samples are collected per each class, for example 200 samples, the sample average is calculated and the variable reference threshold values $S_{min}$ and $S_{max}$ are updated according to the following criterion:

$$S_{min} = \frac{\left(\begin{array}{c}\text{average in reference area } + \\ \text{average in absence reference area}\end{array}\right) - \text{hysteresis}}{2}$$

$$S_{max} = \frac{\left(\begin{array}{c}\text{average in reference area } + \\ \text{average in absence reference area}\end{array}\right) - \text{hysteresis}}{2}$$

where the hysteresis is a value between, for example, 1% and 10% of the supply voltage $V_{cc}$.

Such maximum and minimum reference threshold values $S_{max}$ and $S_{min}$ are used for the classification of the samples of signal s7.

The comparison, at step 220, between each sample and the reference threshold values $S_{min}$ and $S_{max}$—see FIG. 2—requires that, at step 230, if the amplitude of the detected sample is lower than the minimum reference threshold value $S_{min}$, the sample is classified as "reference area" and the corresponding signal s8 output from the program control and processing unit 8 shows an amplitude approximately equal to $V_{cc}$ (step 300); if the amplitude of the sample is instead higher than the maximum reference threshold value $S_{max}$, the sample is classified as "absence of reference area" and the corresponding signal s8 output from the program control and processing unit 8 shows an amplitude approximately equal to 0 Volt (step 300); finally, if the sample amplitude lies between the two minimum and maximum reference threshold values $S_{min}$ and $S_{max}$, the sample is classified as undetermined and it is discharged.

Figure 5:
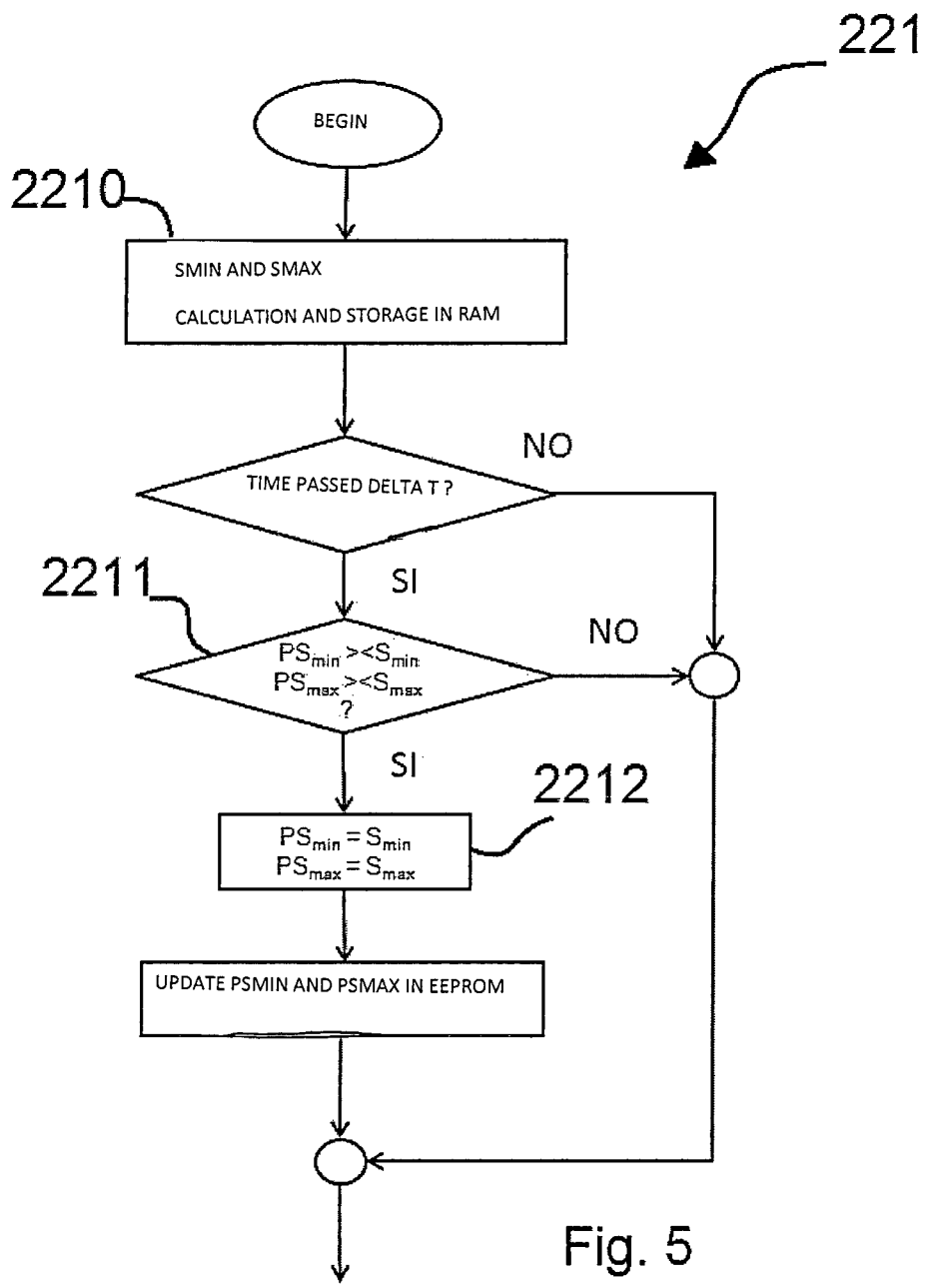
FIG. 5 shows a flowchart of the method of updating the reference threshold values employed in the method according to the present invention.

It is clear that, based on the application and the load connected downstream of the program control and processing unit 8, the signal s8 output from such program control and processing unit 8 can have, viceversa, an amplitude equal to 0 Volt at the "reference area" and an amplitude equal to $V_{cc}$ or a fraction thereof at an area not including the reference area. Advantageously, reference being made to step 2210 illustrated in FIG. 5, the minimum and maximum reference threshold values $S_{min}$ and $S_{max}$ are updated, e.g. about every 200-250 ms, and stored in the program control and processing unit 8, preferably in a RAM memory.

After a certain time interval, e.g. about every minute or every hour, the first minimum and maximum threshold values $PS_{min}$ and $PS_{max}$ described above are compared to the minimum and maximum reference threshold values $S_{min}$ and $S_{max}$ thereby calculated (step 2211).

If a certain difference is found between the first minimum and maximum reference threshold values $PS_{min}$ and $PS_{max}$ and the minimum and maximum reference threshold values $S_{min}$ and $S_{max}$ thereby calculated, this means that the signal s7 under evaluation has undergone a drift due to the reasons described above.

If such a difference exceeds a certain range, e.g. 15%, in order to take into account such drift, the first minimum and maximum threshold values $PS_{min}$ and $PS_{max}$ set by the manufacturer and stored in the EEPROM are substituted, at step 2212, by the calculated minimum and maximum reference threshold values $S_{min}$ and $S_{max}$, so that at the subsequent activation of the detecting means 7, the program control and processing unit 8 has the first minimum and maximum reference threshold values stored therein, the first minimum and maximum reference threshold values corresponding to the real working conditions of the cylinder-piston unit 1 according to the present invention. After such an update, the method returns to step 220.

It is clear that the program control and processing unit 8 takes into account both the quick variations of signal s7 (by updating the minimum and maximum reference threshold values $S_{min}$ and $S_{max}$, e.g. about every 200 ms), and the slow drifts of the signal by updating, with a lower frequency (about every minute) the first minimum and maximum threshold values $PS_{min}$ and $PS_{max}$. In this way, a considerable safety margin can always be kept with respect to potential drifts caused by defects occurred in the tubular body 2 or moving body 5 of the cylinder-piston unit and/or by variations of the working conditions, under which the cylinder-piston unit is working. Basically, the detection method according to the present invention takes into account and compensates for the ageing of the cylinder-piston unit.

Figure 6:
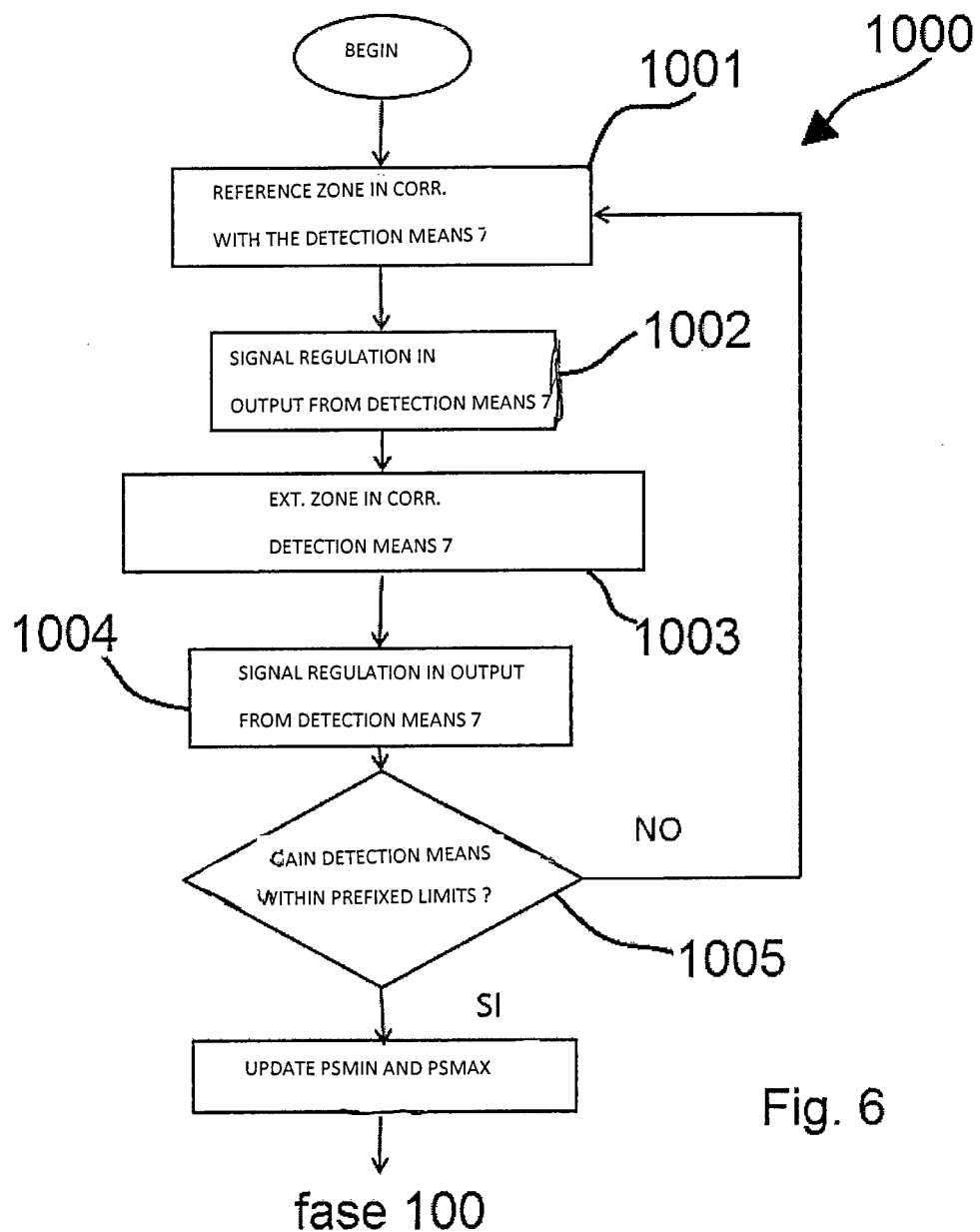
FIG. 6 is a flowchart of the calibration procedure for the detecting means of the cylinder-piston unit according to the present invention.

Moreover, the detection method according to the present invention provides for a calibration step 1000 (FIG. 6) at the first activation of the detecting means 7, wherein the first minimum and maximum threshold values $PS_{min}$ and $PS_{max}$ are calculated and stored in the program control and processing unit. In fact, if these threshold values are null at the first activation of the detecting means 7, at step 1001 the calibration procedure is activated, by applying at the detection area 7c of the detecting means 7 a material corresponding to that provided for in the reference area 5c of the moving body 5 in the cylinder-piston unit, and the output from the receiving means 7b of the detecting means 7 is adjusted on known predetermined values e.g. by means of a digital trimmer (step 1002). Then the same procedure is carried out by applying at the detection area 7c of the detecting means 7 a material corresponding to that provided for in the moving body 5 outside the reference area 5c (steps 1003 and 1004). The receiving means 7b of the detecting means 7 is operated so that the difference or gain of the output signal s7, at the reference area or outside the reference area, is high enough i.e. as high as possible, for example equal to $V_{cc}/2$ (step 1005). If this does not occur, the calibration procedure goes back to step 1001.

As it will be clearly understood, such a calibration of the detecting means of the cylinder-piston unit for implementing the method of the present invention can be carried out at the first activation of the detecting means or when the detecting means are returned from the field, in the case when they are returned to the manufacturer for checking their proper functioning. In this latter case, a comparison is performed between the first minimum and maximum threshold values $PS_{min}$ and $PS_{max}$, stored in the EEPROM memory of the program control and processing unit 8, and the first minimum and maximum threshold values $PS_{min}$ and $PS_{max}$ set by the manufacturer. If they are not the same, the calibration procedure is initiated as described above.

The reliability of the detection method has been tested with experimental tests also at extreme working conditions. Results demonstrate that the detection method according to the present invention allows to compensate the components' drifts and ensures the correct functioning of the cylinder-piston unit for a long time.

The device and the method described above are subject to several modifications and variants within the scope of protection defined in the following claims.

Figure 4B:
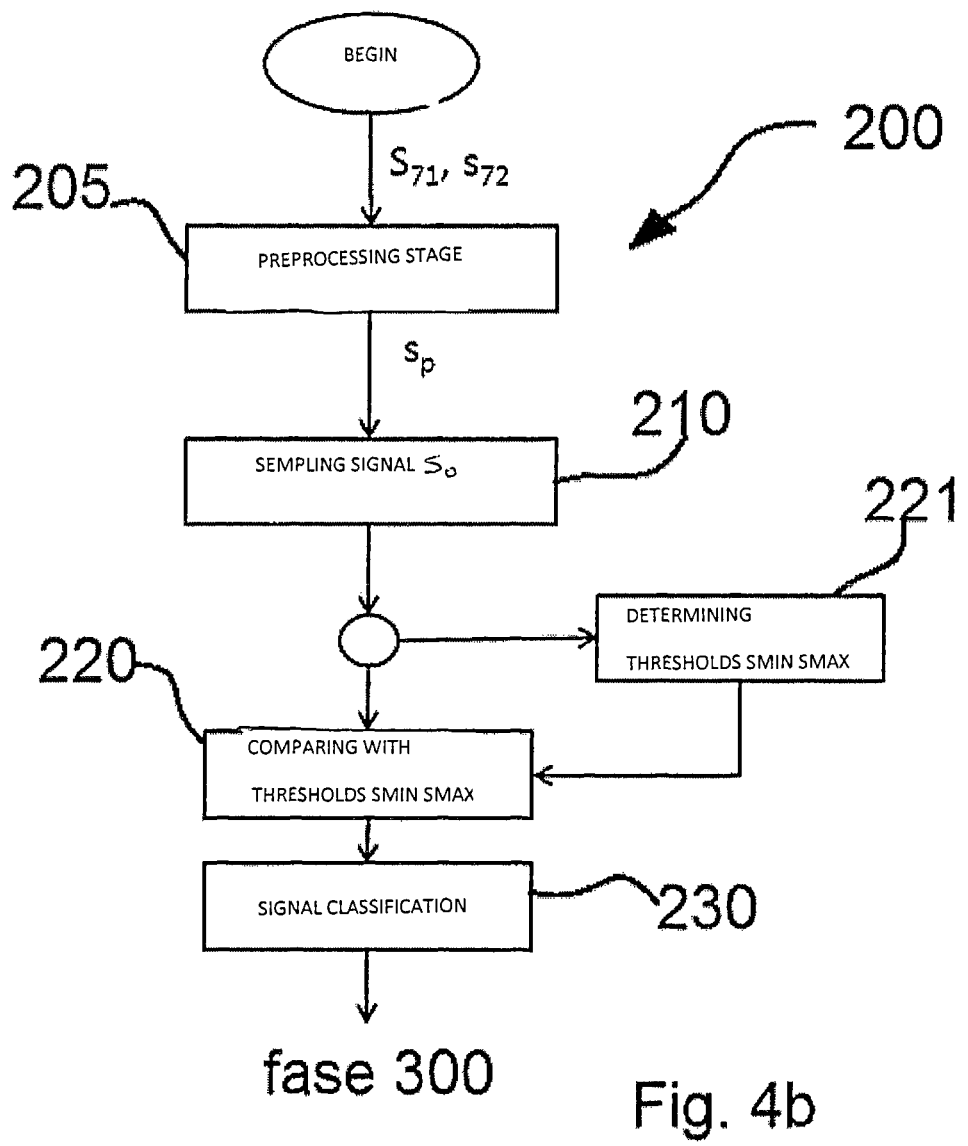

With reference to the detecting method above described, the skilled person will easily understand that it is applicable to the signal sp output from the pre-processing stage of the program control and processing unit 8. In such a case, the signal processing step 200 provides for an initial step 205 (illustrated in FIG. 4b) wherein each signal s7 output from each receiving means 7b of the detecting means 7 is sent to the pre-processing stage of the program control and processing unit 8, where it is pre-processed as described above.

Even further, the pre-processing of the output signal from the detecting means 7 can be performed, rather than using the logic gates mentioned above, by instructions executable by the program control and processing unit 8, based on the electrical signals s7 generated by each receiving means 7b. Such electrical signals input to the pre-processing means, can be either of analog or digital type. In the case wherein the signal s7 is digital, the signal is assumed to have been properly sampled and the logic function is executed by means of predetermined threshold values.

Even further, the detection method described above is similarly applicable to a cylinder-piston unit provided with one or more reference areas obtained on the corresponding moving part 5.

What is claimed is:

1. A method of detecting the reciprocal position between a cylinder and a piston in a cylinder-piston unit, said method comprising the steps of:
    arranging a cylinder-piston unit including:
        at least one tubular body having at least one through receiving seat;
        at least one moving body longitudinally translatable in said tubular body, said moving body being provided with at least one reference area extending for a portion on the surface of said moving body, along the longitudinal axis of said moving body;
        at least detecting means, receivable in said through receiving seat of said tubular body, faced towards said moving body in said tubular body, and designed to detect the presence or absence of said reference area at a detection area thereof, and to generate at least one corresponding output electrical signal, in response to the detection or not of said reference area of said moving body;
        at least one program control and processing unit, designed to receive in input said at least one output electrical signals from said detecting means and to generate in output at least one electrical signal of detection;
    activating said detecting means;
    processing, by said at least one program control and processing unit, said at least one signals output from said detecting means, said processing step including a comparison between said at least one output electrical signal and respective maximum and minimum reference threshold values ($S_{max}$, $S_{min}$);
    generating, based on said processing an electrical signal of detection by said at least one program control and processing unit;
    wherein said maximum and minimum reference threshold values ($S_{max}$, $S_{min}$) are calculated based on average values of the amplitudes of a plurality of sample of said one output electrical signal and periodically updateable according to the following relationships:

$$S_{min}=[(\text{average in reference area}+\text{average in absence reference area})-\text{hysteresis}]/2$$

$$S_{max}=[(\text{average in reference area}+\text{average in absence reference area})+\text{hysteresis}]/2$$

wherein said "hysteresis" is a predetermined value, said "average in reference area" corresponds to the average value of the amplitudes of said plurality of samples of said signal detected at said reference area, and said "average in absence reference area" corresponds to the average value of the amplitudes of said plurality of samples of said signal detected at an area outside said reference area.

2. A method according to claim 1, characterized in that it includes a periodic comparison (step 2211) between the values of said maximum and minimum reference threshold values ($S_{max}$, $S_{min}$) and first maximum and minimum threshold values ($PS_{max}$, $PS_{min}$).

3. A method according to claim 2, wherein if said comparison shows a difference between the values of said maximum and minimum reference threshold values ($S_{max}$, $S_{min}$) and said first maximum and minimum threshold values ($PS_{max}$, $PS_{min}$), higher than a predetermined threshold value, then the values of said first maximum and minimum threshold values ($PS_{max}$, $PS_{min}$) are set equal to the threshold values of said maximum and minimum reference threshold values ($S_{max}$, $S_{min}$).

4. A method according to claim 2, wherein said periodic comparison between said values of said maximum and minimum reference threshold values ($S_{max}$, $S_{min}$) and said first maximum and minimum threshold values ($PS_{max}$, $PS_{min}$) is executed less frequently than the update of said maximum and minimum reference threshold values ($S_{max}$, $S_{min}$).

5. A method according to claim 1, further comprising a calibration step of said detecting means.

6. A method according to claim 5, wherein said calibration step comprises:
    the positioning, at said detection area of said detecting means, of a material used in said reference area;
    the activation of said detecting means;
    the adjustment of said electrical signal output from said detecting means;
    the positioning, at said detection area of said detecting means, of a material used in said moving body outside said reference area;
    the activation of said detecting means;
    the adjustment of said electrical output signal output from said detecting means.

7. A method according to claim 6, wherein said steps of adjustment of said electrical signal output from said detecting means comprise the use of a digital trimmer.

8. A cylinder-piston unit for implementing the method of detection of the reciprocal position between a cylinder and a piston according to claim 1, comprising:
- at least one tubular body provided with at least one through receiving seat;
- at least one moving body longitudinally translatable in said tubular body, said moving body being provided with at least one reference area extending for a portion on the surface of said moving body, along the longitudinal axis of said moving body;
- at least detecting means receivable in said through receiving seat of said tubular body, faced towards said moving body in said tubular body, and designed to detect the presence or absence of said reference area at a detection area thereof, and to generate at least one corresponding output electrical signal, in response to the detection or not of said reference area of said moving body;
- at least one program control and processing unit, designed to receive in input said at least one output electrical signal from said detecting means, and generate in output at least one electrical signal of detection;

wherein said program control and processing unit comprises at least one pre-processing step of said at least one output electrical signal and in that said detecting means are removably receivable in said receiving seat according to at least one operative configuration, so that, depending on said at least one operative configuration, the output electrical signal from said pre-processing stage of said program control and processing unit has, at the portion thereof of detection of said reference area, a width which is substantially equal or narrower or wider than the dimension of said portion of said reference area along the longitudinal axis of said moving body.

9. A cylinder-piston unit according to claim 8, wherein said at least one operative configuration of said detecting means comprises at least one emitting means of light radiation and at least one receiving means for said light radiation located along an axis parallel to the longitudinal axis of said cylinder-piston unit.

10. A cylinder-piston unit according claim 8, wherein said operative configuration of said detecting means comprises at least one emitting means of light radiation and at least one receiving means for said light radiation, located along an axis orthogonal to the longitudinal axis of said cylinder-piston unit.

11. A cylinder-piston unit according to claim 8, wherein said operative configuration of said detecting means comprises two emitting means and two receiving means located side by side, said receiving means being placed at the opposite ends of said operative configuration.

12. A cylinder-piston unit according to claim 8, wherein said operative configuration of said detecting means comprises one emitting means and two receiving means located side by side, said receiving means being placed opposite with respect to said emitting means.

13. A cylinder-piston unit according to claim 8, wherein said receiving means of said operative configuration of said detecting means are placed spaced from the other.

14. A cylinder-piston unit according to claim 8, wherein said pre-processing stage of said at least one output signal is designed to implement at least one logic function selected among an AND, or an OR or a SUM or a PRODUCT or a DIFFERENCE or a DIVISION function or a combination thereof.

15. A cylinder-piston unit according to claim 14, wherein said pre-processing stage designed to implement at least one logic function provides for the implementation of said logic function the use of at least one corresponding logic gate selected among an AND or an OR or a SUM or a PRODUCT or a DIFFERENCE or a DIVISION function or a combination thereof.

16. A method of modifying the width of the electrical signal of detection output from a program control and processing unit of a cylinder-piston unit according to claim 8, at the portion thereof of detection of said reference area, said cylinder-piston unit comprising said detecting means received in said through receiving seat according to an operative configuration, said method including the step of moving said detecting means in said receiving seat from said operative configuration to said at least another operative configuration.

17. A method according to claim 16, wherein said step of moving said detecting means in said receiving seat from said operative configuration to said at least another operative configuration comprises a step of rotating of about 90° said detecting means.

* * * * *